United States Patent
Nakashima et al.

(10) Patent No.: US 7,558,937 B2
(45) Date of Patent: Jul. 7, 2009

(54) DISK ARRAY DEVICE MEMORY HAVING AREAS DYNAMICALLY ADJUSTABLE IN SIZE

(75) Inventors: Kazuo Nakashima, Kawasaki (JP); Osamu Kimura, Kawasaki (JP); Koji Uchida, Kawasaki (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 11/045,103

(22) Filed: Jan. 31, 2005

(65) Prior Publication Data
US 2006/0075187 A1    Apr. 6, 2006

(30) Foreign Application Priority Data
Oct. 4, 2004    (JP) .............................. 2004-291733

(51) Int. Cl.
G06F 12/00 (2006.01)
G06F 13/00 (2006.01)
G06F 13/28 (2006.01)

(52) U.S. Cl. .................. 711/173; 711/113; 711/129; 711/153; 711/170

(58) Field of Classification Search .................. 711/114
See application file for complete search history.

(56) References Cited

U.S. PATENT DOCUMENTS

| | | | |
|---|---|---|---|
| 4,947,319 A | 8/1990 | Bozman | |
| 5,822,562 A * | 10/1998 | Dahlen et al. | 711/170 |
| 6,421,747 B1 * | 7/2002 | Wilson | 710/56 |
| 6,606,715 B1 * | 8/2003 | Kikuchi | 714/15 |
| 2004/0250020 A1 | 12/2004 | Kuwata | |

FOREIGN PATENT DOCUMENTS

| | | |
|---|---|---|
| EP | 0359923 A2 | 3/1990 |
| EP | 0359923 A3 | 1/1991 |
| JP | 3-015957 | 1/1991 |
| JP | 07072981 A | 3/1995 |
| JP | 8-006858 | 1/1996 |
| JP | 11288387 A | 10/1999 |
| JP | 2000227866 A | 8/2000 |
| JP | 2005-004282 | 1/2005 |

* cited by examiner

Primary Examiner—Kevin L Ellis
Assistant Examiner—Ryan Bertram
(74) Attorney, Agent, or Firm—Arent Fox LLP

(57) ABSTRACT

A disk array device having a plurality of hard disk units has a large-capacity memory mounted on a controller module which controls the whole device. The large-capacity memory has a system area managed by an OS and a cache area serving as a cache memory, and in addition, it has a table area which stores management/control information of the device and whose area size is changeable at an arbitrary instance. Therefore, it is possible to change the table area according to the state of the device in an active state without ON/OFF of a power source, so that an area not in use in the table area can be released for use as the cache memory. This makes it possible to appropriately varying the sizes of the table area and the cache area in an active state while the device is in operation, thereby realizing effective use of the large-capacity memory.

18 Claims, 14 Drawing Sheets

F I G. 5
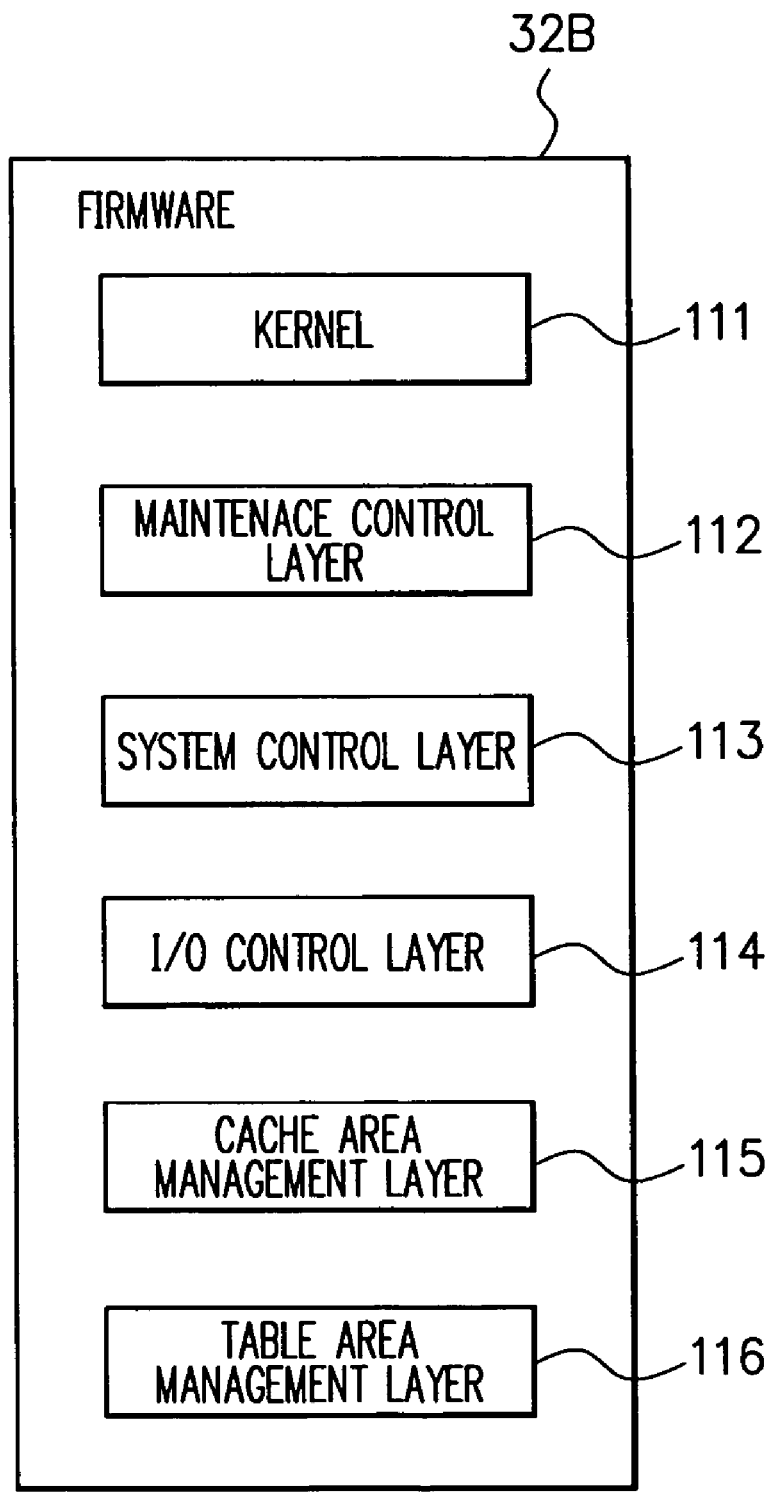

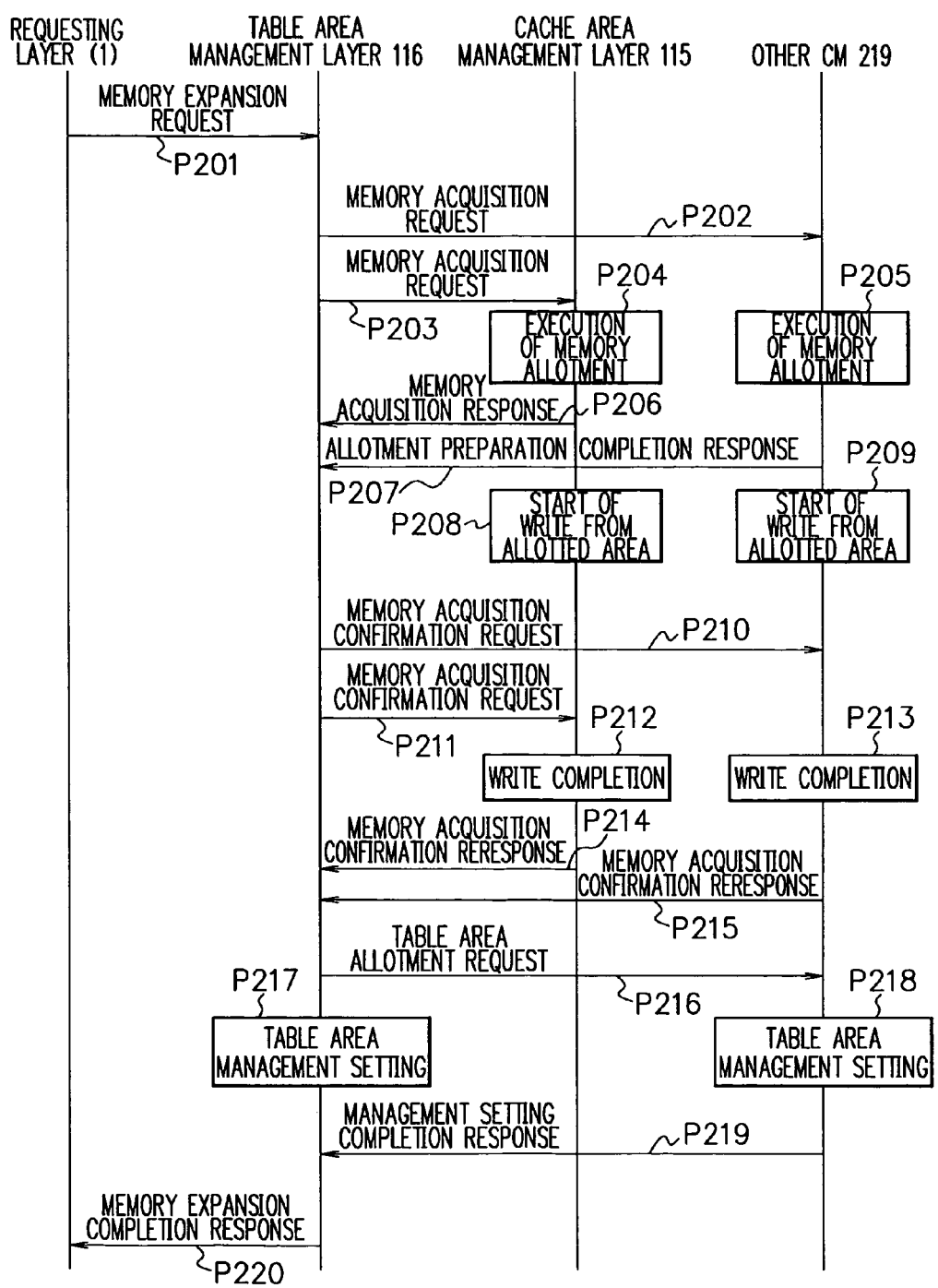

DISK ARRAY DEVICE MEMORY HAVING AREAS DYNAMICALLY ADJUSTABLE IN SIZE

CROSS-REFERENCE TO RELATED APPLICATIONS

This application is based upon and claims the benefit of priority from the prior Japanese Patent Application No. 2004-291733, filed on Oct. 4, 2004, the entire contents of which are incorporated herein by reference.

BACKGROUND OF THE INVENTION

1. Field of the Invention

The present invention relates to a disk array device, more particularly, to a technology of controlling area allotment of a memory mounted on the disk array device.

2. Description of the Related Art

Currently, a data volume to be handed in business organizations and so on is increasing day by day in accordance with the development of information infrastructure. As a method of saving important information such as customer data and order data, disk array devices of SAN (Storage Area Network)/NAS (Network Attached Storage) type are rapidly coming into wide use. A disk array device includes a large-capacity storage device constituted of a plurality of hard disks (magnetic disk devices) and it reads/writes data from/to the hard disks in response to a request from a server and so on.

Such a disk array device is indispensable for configuring the information infrastructure such a society system. Therefore, there is a strong demand for realizing a disk array device having both high reliability and high availability whose setting are flexibly variable while continuing its nonstop operation.

Further, in order to realize high-speed data transfer to improve the performance of the whole system, a computer system including a disk array device generally has a memory called a cache memory (hereinafter, also simply referred to as a "cache") which can be accessed at a higher speed than a main storage device (for example, a magnetic disk device in a case of the aforesaid disk array device). In such a computer system, data read from the main storage device is temporarily stored in the cache, and if requested data exists in the cache, the cache is accessed, thereby reducing the number of accesses to the main storage device to realize higher speed of processing.

Here, in the computer system including the cache, as the capacity of the cache is larger, the number of accesses to the main storage device can be generally reduced, resulting in a higher processing speed. However, a memory used as the cache is higher in bit cost than the main storage device, and is often used as a memory for storing control information (data) relating to other functions such as, for example, an OS (operating system). Accordingly, the capacity usable as the cache is limited. There have been proposed technologies for optimizing a cache function realized by the use of a cache according to the operational status or the like of a computer system (see, for example, Japanese Patent Application Laid-open No. 2000-227866, Japanese Patent Application Laid-open No. Hei 11-288387, Japanese Patent Application Laid-open No. Hei 7-72981, and so on).

Generally, in a computer system including a cache, a higher performance can be realized as the capacity of the cache is larger. This also applies to a disk array device. Conventionally, in a memory mounted on a disk array device, a system memory area used by an OS and a firmware for management (system area) and a memory area used as a cache (cache area) are set upon power-on, and the sizes of these areas are fixed and unchangeable while the device is in operation. Specifically, in setting memory areas upon power-on, the maximum capacity necessary for operational processing of the device is secured as the system area and the remaining capacity is allotted as the cache area.

However, in the conventional disk array device, the maximum capacity secured as the system area also includes, for example, an area that is used only temporarily for specific processing operation while the device is in operation but is not used constantly. Such an area is scarcely used in actual operation but cannot be used as the cache memory, so that the memory is not effectively used (resulting in lower use efficiency of the memory).

SUMMARY OF THE INVENTION

It is an object of the present invention to realize effective use of a memory mounted on a disk array device by allotting a memory area appropriately according to the state of the disk array device.

A disk array device of the present invention includes: a control part controlling the disk array device; and a plurality of disk devices storing data. A memory mounted on the control part has a system area managed by an operating system, a cache area serving as a cache memory to temporarily store input/output data, and in addition, it has a table area which stores management/control information relating to the disk array device and whose area size is changeable at an arbitrary instance.

According to the above-described structure, the table area for storing the management/control information relating to the disk array device, which has been conventionally stored in a system area, is newly provided, and the area size of the table area is changeable at an arbitrary instance, so that the table area can be set any time according to the state of the device without an ON/OFF operation of a power source. Therefore, an area not in use in the table area can be released for use as a cache area.

BRIEF DESCRIPTION OF THE DRAWINGS

FIG. 5 is a diagram showing a configuration example of a firmware in this embodiment;

FIG. 10 is a sequence diagram showing the flow of an active memory expansion process in this embodiment;

DETAILED DESCRIPTION OF THE PREFERRED EMBODIMENTS

Hereinafter, an embodiment of the present invention will be described based on the drawings.

First, problems to be solved in a disk array device will be described with reference to FIG. 1 to FIG. 3.

Figure 1:
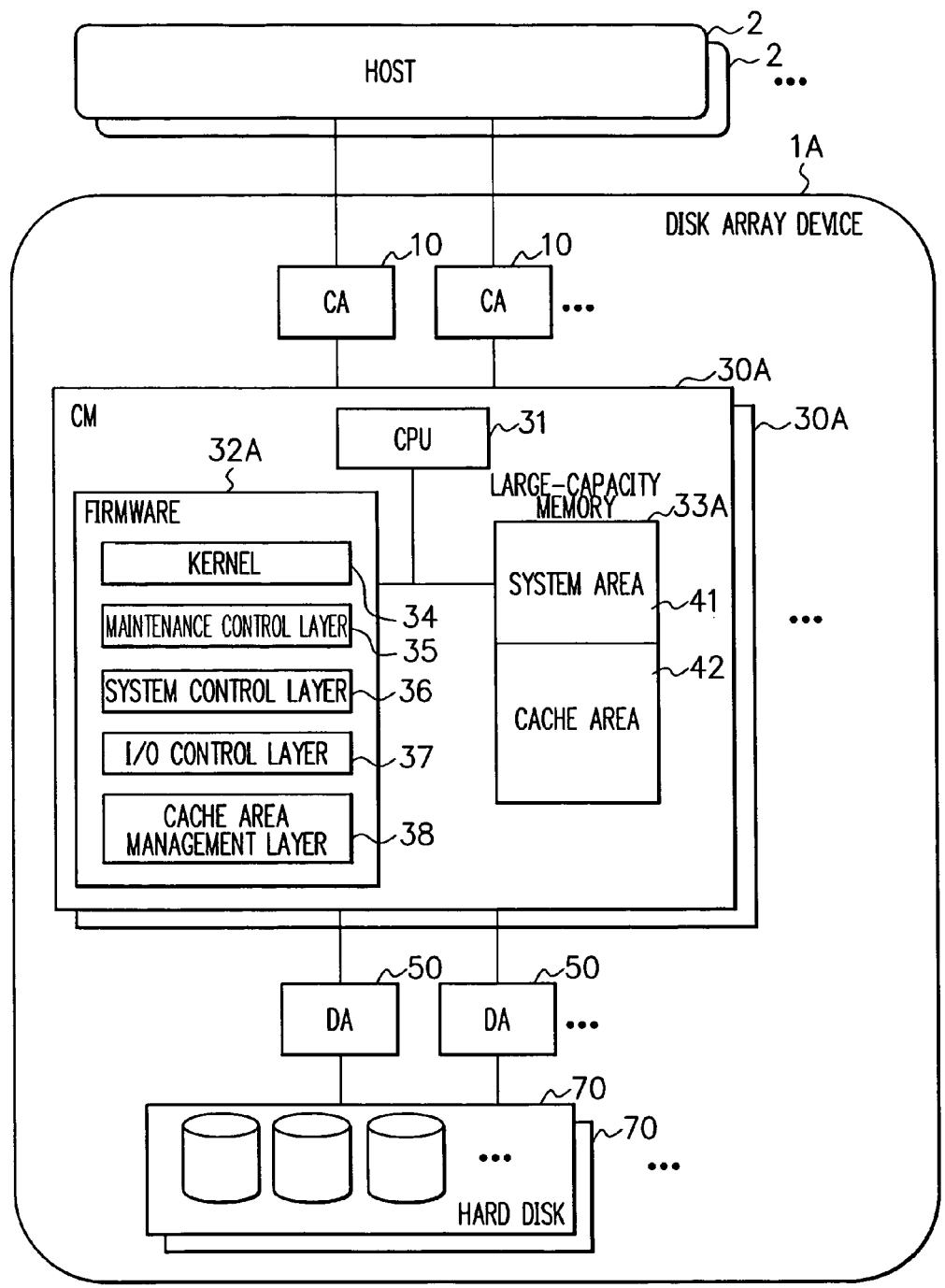
FIG. 1 is a block diagram showing a configuration example of a disk array device.

FIG. 1 is a block diagram showing a configuration example of a disk array device 1A.

The disk array device 1A includes: channel adapters (CAs) 10 controlling connection to host computers (hereinafter, the host computer simply referred to as a "host"); controller modules (CMs) 30A controlling the whole device; hard disk units 70 each consisting of one or a plurality of hard disks and storing data; and device adapters (DAs) 50 controlling connection between the controller modules 30A and the hard disk units 70.

Each of the controller modules 30A includes a CPU 31, a firmware 32A, and a large-capacity memory 33A.

The CPU 31 executes processing according to an OS (operating system) or the like to perform various kinds of controls. The firmware 32A includes: a kernel 34 serving basic functions; a maintenance control layer 35 controlling a maintenance work of the device; a system control layer 36 managing the state of the whole device; an I/O control layer 37 controlling input/output (I/O) processing; a cache area management layer 38 managing a memory of a cache area 42 in the large-capacity memory 33A, and so on.

The large-capacity memory 33A is constituted of a semiconductor memory or the like accessible by the hard disk units 70 at a high speed. The large-capacity memory 33A is divided into: a system area 41 which stores data managed by the kernel 34 of the firmware 32A and management/control information necessary for managing/controlling the device and which is used by an OS and the firmware 32A for management; and the cache area 42 that is an area serving as a cache memory to temporarily store input/output (I/O) data.

The allotment of memory areas to the system area 41 and the memory area 42 in the large-capacity memory 33A is determined upon power-on of the disk array device 1A. First, the size of the system area 41 is determined. Since the size of the system area 41 is fixedly determined in advance according to the maximum memory usage volume necessary for management by the OS and the firmware 32A, this predetermined size is secured as the system area 41. Then, the remaining area in the large-capacity memory 33A excluding the memory area allotted to the system area 41 is all allotted to the cache area 42.

Incidentally, in FIG. 1, the number of the channel adapters 10, the controller modules 30A, and the device adapters 50, the hard disk units 70, and the hosts 2 is two, but the number thereof is arbitrary.

A basic operational principle of I/O processing in the disk array device 1A using thus allotted cache area 42 will be described with reference to FIG. 2 and FIG. 3.

Figure 2:
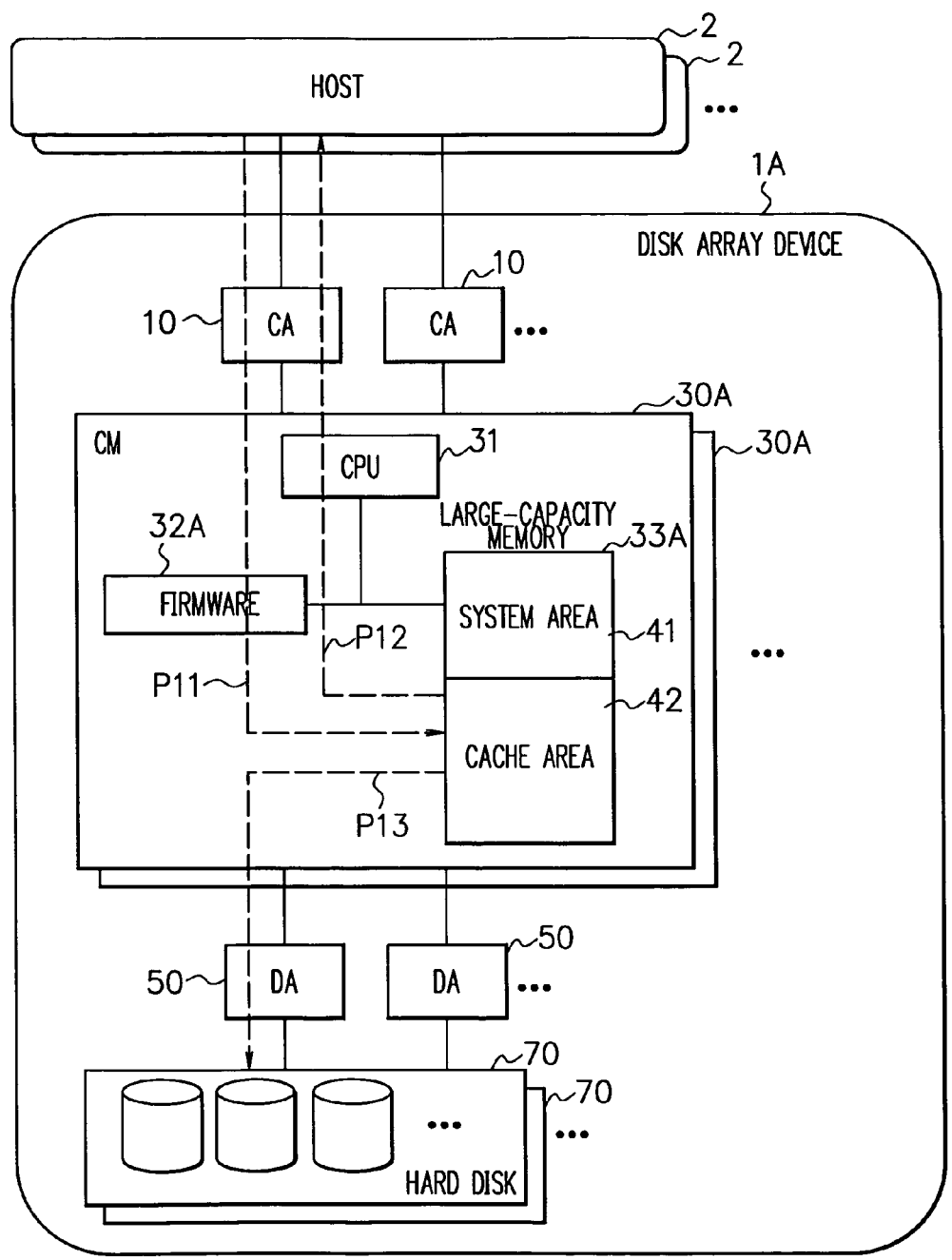
FIG. 2 is a diagram showing an I/O processing operation (cache hit) of the disk array device shown in FIG. 1.

FIG. 2 is a diagram showing an I/O processing operation at cache hit.

First, when the host 2 sends a read request or a write request to the disk array device 1A, the I/O control layer 37 in the firmware 32A receives the request and confirms whether or not data to be accessed relevant to this request exists in the cache area 42 (P11).

When the data to be accessed exists in the cache area 42, that is, when the data to be accessed is developed and stored in the cache area 42 (this is called "cache hit"), the data in the cache area 42 is read/written and a response is sent to the host 2, thereby finishing the processing (P12). Note that the data written to the cache area 42 is written to the hard disk unit 70 (hard disk) (this is called "write back") asynchronously with processing for the host 2 by the controller module 30A (the I/O control layer in the firmware 32A)(P13).

In the case of such cache hit in the read/write request from the host 2, only the read/write of the data temporarily pre-stored in the cache area 42 is executed. Therefore, since only the read/write from/to the cache area 42 is executed as a response to the host 2, high-speed execution of the I/O processing is enabled.

Figure 3:
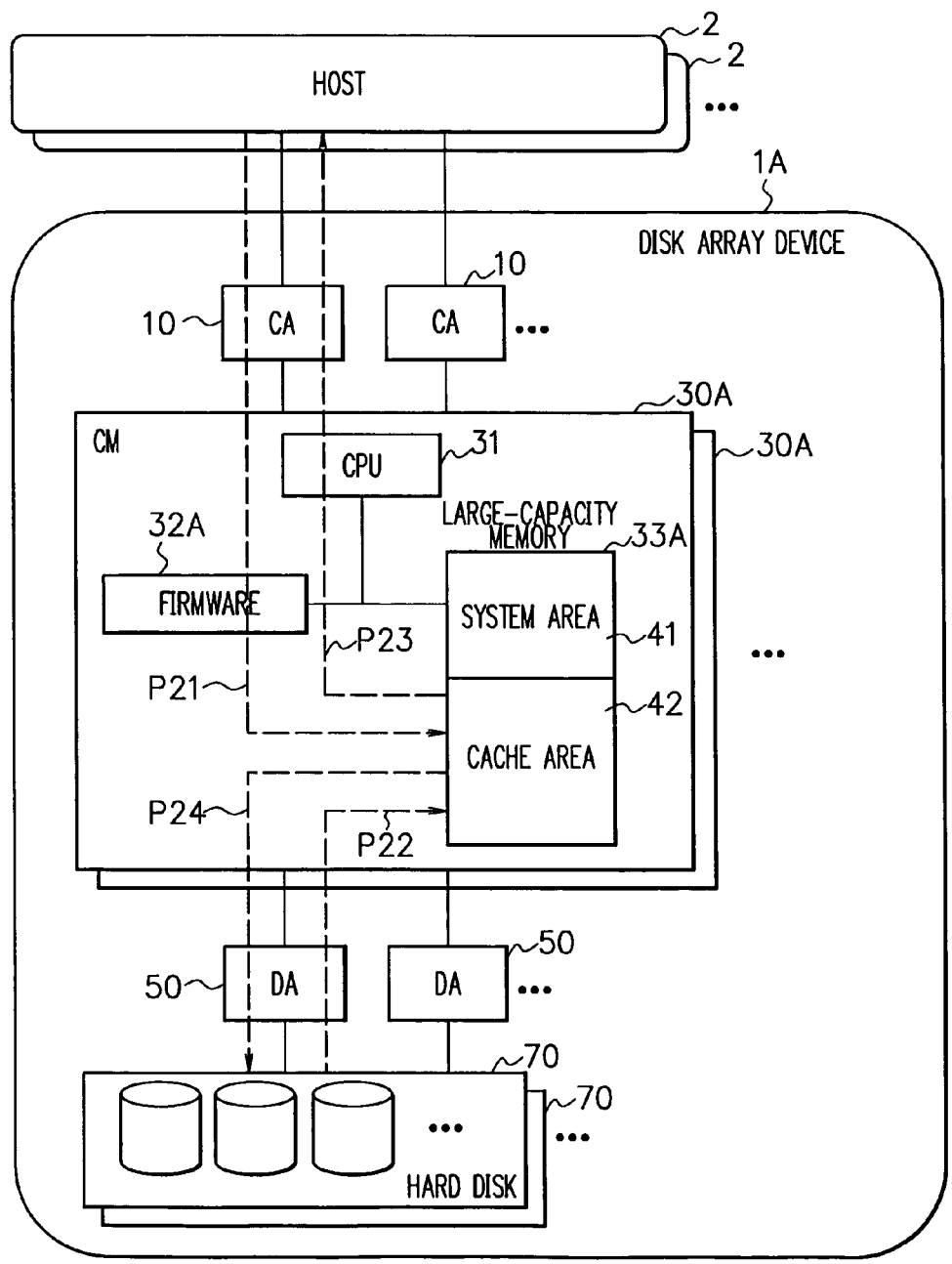
FIG. 3 is a diagram showing an I/O processing operation (cache miss) of the disk array device shown in FIG. 1.

FIG. 3 is a diagram showing an I/O processing operation at cache miss.

First, when the host 2 sends a read/write request to the disk array device 1A, and the I/O control layer 37 receives the request and confirms whether or not the data to be accessed relevant to this request exists in the cache area 42, as in the processing operation shown in FIG. 2 (P21).

In the example shown in FIG. 3, since the data to be accessed does not exist in the cache area 42 (this is called "cache miss"), a data area to be accessed is subsequently transferred from the hard disk unit 70 to the cache area 42 (P22). Thereafter, the data to be accessed that is transferred to and developed in the cache area 42 is read/written as a response to the host 2, which completes the processing (P23).

Note that the data written to the cache area 42 is written to the hard disk asynchronously with the processing for the host 2 by the controller module 30A (the I/O control layer 37), similarly to the case of the cache hit shown in FIG. 2 (P24).

In the case of such cache miss in the read/write request from the host 2, it is necessary to transfer the data to be accessed to the cache area 42 from the hard disk unit 70 lower in speed than the large-capacity memory (generally, a semiconductor memory is used) 33A. Consequently, the I/O processing operation requires a longer time than that in the case of the cache hit.

Here, in the disk array device 1A, the information stored in the system area 41 in the large-capacity memory 33A includes the device management/control information, but the size of the system area 41 is pre-fixed according to the maximum memory usage volume. Therefore, the size of the system area 41 is unchangeable while the device is in operation.

However, the device management/control information may possibly include information only temporarily used or information used only when a specific function is used. As is apparent from the processing operations shown in FIG. 2 and FIG. 3, in the disk array device, a cache hit ratio is higher as the size of the cache area (cache memory) 42 is larger, resulting in improved performance of the device. Therefore, the effective use of the cache memory is required in the disk array device. However, since an area once secured as the system area 41 in the mounted large-capacity memory 33A is not usable as the cache area 42. Therefore, the memory managing method as described above has a problem that it is not possible to effectively use the large-capacity memory 33A (to be more specific, the memory area of the cache area 42).

By changing the setting of the device by OFF/ON of a power source of the device, it is possible to change the usage ratio of the system area 41 and the cache area 42 in the large-capacity memory 33A according to an intended use. However, at each request, a user side has to manually calculate and set a memory area (usage amount) for storing the device management/control information, namely, the area to be secured as the system area 41, according to the size and intended use of the large-capacity memory 33A. This is problematic in that the setting of the memory area according to the state of the device becomes complicated and difficult.

Moreover, since a nonstop operation is required in a disk array device that is often configured as a device used as a society system, a work of changing the setting of the device by OFF/ON of a power source is expected to be difficult in actual practice. Further, even if the change of the setting of the device by OFF/ON of the power source should be possible, maintenance cost required for the work of changing the setting of the device is increased and the system stops, even though only for a short time. This poses a problem that availability of the device cannot be maintained.

In consideration of such circumstances, the disk array device according to the embodiment of the present invention to be described below is structured so as to be capable of changing area setting in a large-capacity memory mounted on a controller module at an arbitrary instance, has high reliability and high availability, and realizes effective use of the large-capacity memory.

Figure 4:
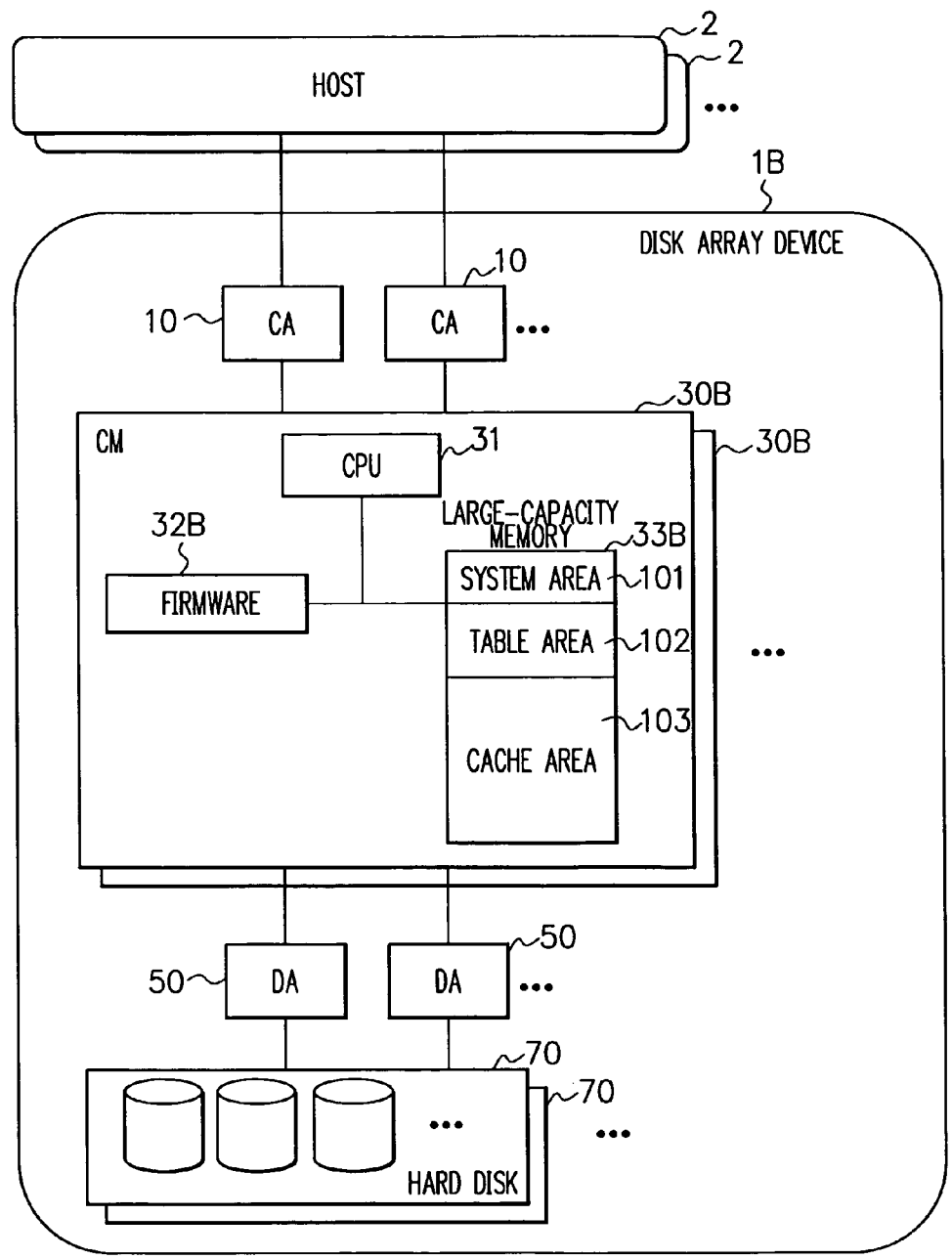
FIG. 4 is a block diagram showing a configuration example of a disk array device according to an embodiment of the present invention.

FIG. 4 is a block diagram showing a configuration example of a disk array device 1B according to an embodiment of the present invention. In FIG. 4, the same reference numerals or symbols are used to designate blocks and the like having the same functions as those of the blocks and so on shown in FIG. 1.

The disk array device 1B includes channel adapters (CAs) 10, controller modules (CMs) 30B, device adapters (DAs) 50, and hard disk units 70. Incidentally, the number of the channel adapters 10, the controller modules 30B, the device adapters 50, the hard disk units 70, and the hosts 2 is two, but the number thereof is arbitrary.

The channel adapters 10 control connection between the hosts 2 and the controller modules 30B (channel control). The channel adapters 10 accept, for example, requests from the hosts 2 to supply the requests to the controller modules 30B.

Each of the channel adapters 10 is connectable to the plural controller modules 30B. That is, one channel adapter 10 has routes for connection to at least the two different controller modules 30B in order to realize redundant configuration.

The controller modules 30B control the whole device. Each of the controller modules 30B has a CPU 31 executing processing according to an OS or the like to perform various kinds of controls, a firmware 32B controlling hardware and the like, and a large-capacity memory 33B.

FIG. 5 is a diagram showing a configuration example of the firmware 32B of the disk array device 1B according to this embodiment. The firmware 32B has a kernel 111 serving basic functions, a maintenance control layer 112 controlling a device maintenance work, a system control layer 113 managing the state of the whole device, an I/O control layer 114 controlling I/O processing, and a cache area management layer 115 managing a cache area 103. In addition, the firmware 32B has a table area management layer 116 managing a table area 102 newly provided in the large-capacity memory 33B, and so on.

The large-capacity memory 33B is constituted of a semiconductor memory or the like accessible at a higher speed than a hard disk. A memory area of the large-capacity memory 33B is divided into three kinds of areas in which the newly provided table area 102 in addition to a system area 101 and the cache area 103 are provided, and each of them is a unit of the management.

The system area 101 is an area storing data managed by the kernel 111 and is managed by the kernel 111. The cache area 103 is an area serving as a cache memory to temporarily store I/O data and is managed by the cache area management layer 115.

The table area 102 is an area storing management/control information necessary for managing/controlling the device and is managed by the table area management layer 116. The table area 102 stores, for example, information temporarily used when the maintenance control layer 112, the system control layer 113, the I/O control layer 114, and so on control/execute respective processing (for example, table data for controlling the device).

As described above, in the disk array device 1B in this embodiment, the table area 102 is newly provided in the large-capacity memory 33B, and the management/control information, which is stored in the system area 41 in the disk array device 1A shown in FIG. 1, is stored in the table area 102. The system area 101 is dedicated to the management of only data managed by the kernel 111.

The areas (area sizes) of the table area 102 and the cache area 103 in the large-capacity memory 33B are changeable without ON/OFF of a power source even while the disk array device 1B is in use (in operation). An area not in use in the table area 102 can be released to be set as the cache area 103, and conversely, an area in the cache area 103 can be set as the table area 102. The control of the memory areas is realized by the cache area management layer 115 and the table area management layer 116.

The device adapters 50 control connection between the controller modules 30B and the hard disk units 70. Each of the device adapters 50 has at least two different routes for realizing redundant configuration, similarly to the channel adapters 10.

The hard disk units 70 store data, each being constituted of one or a plurality of hard disks.

Figure 6:
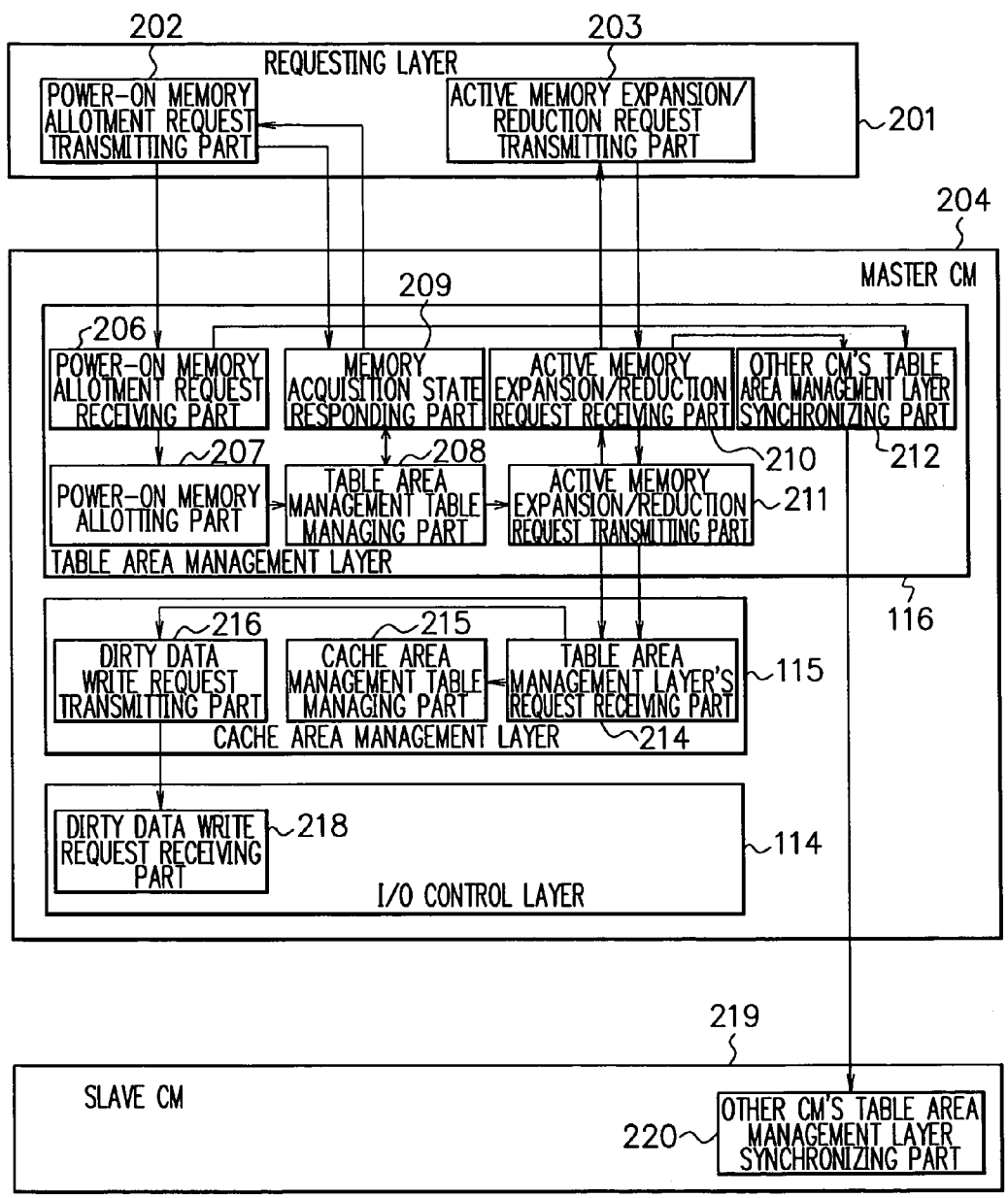
FIG. 6 is a block diagram showing a functional configuration example of controller modules in this embodiment.

FIG. 6 is a block diagram showing a functional configuration example of the controller modules 30B.

The disk array device 1B according to this embodiment includes the plural controller modules 30B, and these plural controller modules 30B are capable of communicating with each other. Further, out of the plural controller modules 30B, one controller module 30B managing these controller modules 30B is called a "master controller module (master CM)" and the other controller module 30B managed by the master CM is called a "slave controller module (slave CM)".

For descriptive convenience, FIG. 6 shows functions provided in the master CM (operating in the master CM) and functions provided in the slave CM (operating in the slave CM) separately. However, the master CM and the slave CM are exchangeable with each other, and each of the controller modules 30B has the functions shown in FIG. 6 irrespective of whether it is the master CM or the slave CM.

In FIG. 6, a requesting layer 201 is an arbitrary layer using the table area 102 in the firmware 32B except the kernel 111, the cache area management layer 115, and the table area management layer 116. The requesting layer 201 has a power-on memory allotment request transmitting part 202 and an active memory expansion/reduction request transmitting part 203.

Upon power-on, the power-on memory allotment request transmitting part 202 transmits to the table area management layer 116 of the master CM 204 a memory allotment application that is an application for a memory capacity of the table area 102 required by itself.

On the other hand, while the device is in operation, the active memory expansion/reduction request transmitting part 203 transmits to the table area management layer 116 of the master CM 204 a memory expansion/reduction request that is a request for memory capacity expansion or reduction of the table area 102.

The table area management layer 116 has a power-on memory allotment request receiving part 206, a power-on memory allotting part 207, a table area management table managing part 208, a memory acquisition state responding part 209, an active memory expansion/reduction request receiving part 210, an active memory expansion/reduction request transmitting part 211, and an other CM's table area management layer synchronizing part 212.

The power-on memory allotment request receiving part 206 receives the memory allotment application transmitted from the requesting layer 201. Based on the received memory allotment application, the power-on memory allotment request receiving part 206 outputs a memory allotment request to the power-on memory allotting part 207 and also outputs an other CM synchronization request to the other CM's table area management layer synchronizing part 212. Here, the other CM synchronization request is intended for synchronizing the processing for the table area 102 of the master CM 204 and the processing for the table area 102 of the slave CM 219.

The power-on memory allotting part 207 performs memory allotment relating to the table area 102 based on the inputted memory allotment request and outputs the result of the memory allotment to the table area management table managing part 208. The table area management table managing part 208 reflects the result of the memory allotment in a table area management table for the table area 102.

The memory acquisition state responding part 209 receives a memory acquisition state inquiry from the power-on memory allotment request transmitting part 202 and returns a memory acquisition state response as a response thereto. At this time, the memory acquisition state responding part 209 inquires the table area management table managing part 208 for the memory acquisition state and returns the obtained result as the response.

The active memory expansion/reduction request receiving part 210 receives a memory expansion/reduction request transmitted from the requesting layer 201. The active memory expansion/reduction request receiving part 210 outputs a memory allotment request to the active memory expansion/reduction request transmitting part 211 based on the received memory expansion/reduction request and also outputs an other CM synchronization request to the other CM's table area management layer synchronizing part 212.

The active memory expansion/reduction request transmitting part 211 transmits a memory acquisition/release request to the cache area management layer 115 based on the inputted memory allotment request. Then, the active memory expansion/reduction request transmitting part 211 asks the cache area management layer 155 about the memory allotment state to output the result of the memory allotment to the table area management table managing part 208 and to output a memory allotment response to the requesting layer 201 via the active memory expansion/reduction request receiving part 210.

The other CM's table area management layer synchronizing part 212 transmits the inputted other CM synchronization request to an other CM's table area management layer synchronizing part 220 of the slave CM 219.

The cache area management layer 115 has a table area management layer's request receiving part 214, a cache area management table managing part 215, and a dirty data write request transmitting part 216.

The table area management layer's request receiving part 214 receives the memory acquisition/release request from the active memory expansion/reduction request transmitting part 211 in the table area management layer 116 to execute memory allotment based on the received memory acquisition/release request and to output the result of the memory allotment to the cache area management table managing part 215. The cache area management table managing part 215 reflects the result of the memory allotment in a cache area management table for the cache area 103. Further, based on the result of the memory allotment, the table area management layer's request receiving part 214 outputs a dirty data write request relating to the relevant area to the I/O control layer 114 via the dirty data write request transmitting part 216.

The dirty data write request receiving part 218 of the I/O control layer 114 receives the dirty data write request from the cache area management layer 115. Consequently, dirty data stored in the area designated by the dirty data write request and unwritten to the hard disk is written to the hard disk with priority.

The other CM's table area management layer synchronizing part 220 of the slave CM 219 receives the other CM synchronization request from the master CM 204 and instructs the respective functional parts to execute the same memory allotment as that of the master CM 204 based on the received other CM synchronization request.

Next, the operation of allotting the table area 102 in the disk array device 1B according to this embodiment will be described. The table area management layer 116 in this embodiment has two methods as methods for allotting the table area 102, which stores the device management/control information, in the large-capacity memory 30B.

A first method is a method in which the table area 102 is allotted based on a memory allotment application from each layer upon power-on of the disk array device 1B. A second method is a method in which a part of the cache area 103 is allotted as the table area 102 in an active state based on the memory expansion/reduction request from each layer while the disk array device 1B is in operation.

First Method: Upon Power-On

The allotment process of the table area 102 according to the first method will be described.

In the disk array device 1B in this embodiment, the table area management layer 116 has an interface to which the memory allotment application is sent from each layer for the purpose of having the table area 102 allotted upon power-on. The table area management layer 116 also has a function of sequentially allotting memory areas as the table area 102 based on the memory allotment application from each layer, starting from an end position of the system area 101 in the large-capacity memory 30B, that is, a start position of the table area 102.

Figure 7:
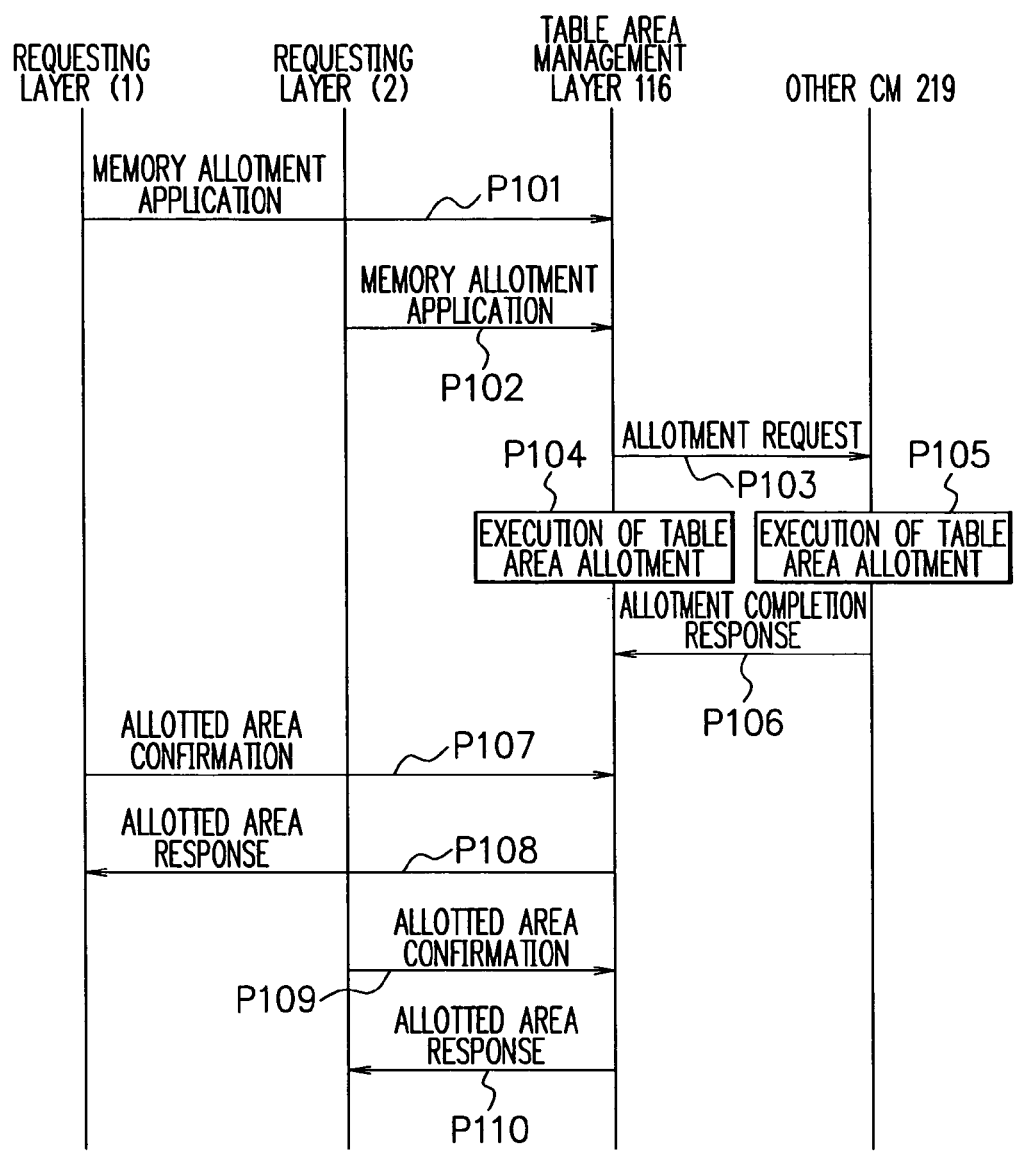
FIG. 7 is a sequence diagram showing the flow of a memory allotment process upon power-on in this embodiment.
Figure 8:
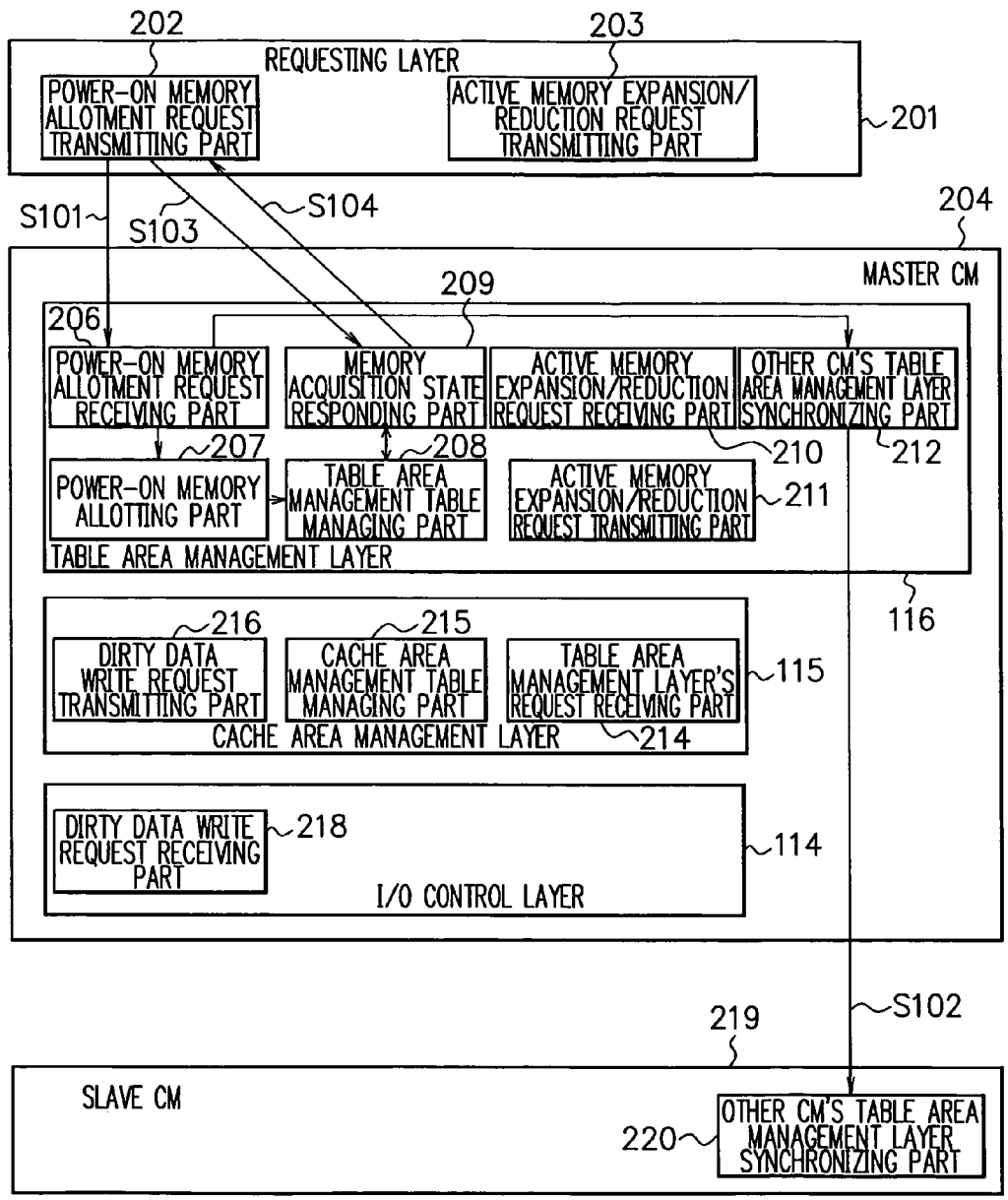
FIG. 8 is a diagram showing the flow of information relating to the memory allotment process upon power-on in this embodiment.

FIG. 7 is a sequence diagram showing the flow of the memory allotment process upon power-on, and FIG. 8 is a diagram showing the flow of information involved in the memory allotment process upon power-on.

First, upon power-on of the disk array device 1B, each requesting layer 201 requiring a memory as the table area 102 makes a memory allotment application S101 to the table area management layer 116 (P101, P102). The memory allotment application S101 by each requesting layer 201 is made in such a manner that a table storing a memory capacity necessary for each requesting layer 201 according to the capacity of the mounted large-capacity memory 33B is prepared in advance, this table is referred to upon activation, and an appropriate size according to the state of the device is obtained as a memory capacity to be demanded. Incidentally, this application may be made in such manner that the state of the device (the capacity of the large-capacity memory 33B and the like) is detected upon activation and an appropriate memory capacity to be demanded is found by automatic calculation. Further, the table storing the memory capacity necessary for the requesting layer 201 may be registered by a user in advance and may be included as a part of the firmware 32B. Alternatively, this table may be provided in the table area management layer 116 and the size to be demanded may be written in advance in an off-line state.

Next, the table area management layer 116 transmits an other CM synchronization request (an allotment request to the other CM) S102 to the other CM (to be more specific, the table area management layer 116 of the slave CM 219) based on the memory allotment application from each requesting layer 201 (P103). Further, the table area management layer 116 sequentially executes the table area allotment based on the memory allotment application from each requesting layer 201 (P104).

This table area allotment is also synchronously executed in the other CM 219 based on the other CM synchronization request S102 sent from the table area management layer 116 (P105). That is, the table area allotments (P104, P105) are executed synchronously in all the controller modules of the disk array device 1B.

When the table area allotment based on the other CM synchronization request S102 sent from the table area management layer 116 is completed, the other CM 219 transmits an allotment completion response indicating this completion, to the table area management layer 116 (P106).

At an instant when the allotment of the table area 102 requested by the memory allotment application sent from each requesting layer 201 is finished, the table area allotment process upon power-on is finished. In this way, the table area management layer 116 sequentially allots memory areas as the table areas 102, starting from the start position of the table area 102 (the end position of the system area 101). An end position of the memory allotment is an end position of the table area 102 as well as a head position of the cache area 103.

After the completion of the memory allotment by the table area management layer 116, each requesting layer 201 makes a confirmation S103 of an area allotted as the table area 102 for which the requesting layer 201 applied to the table area management layer 116 (memory acquisition state confirmation) (P107, P109). Then, when it is confirmed that the memory allotment is normally completed according to the application from each requesting layer 201, the table area management layer 116 notifies an address of the allotted area as a response (memory acquisition state response) S104 to each requesting layer 201 (P108, P109).

Thereafter, each requesting layer 201 recognizes that the area address notified by the response S104 is the table area 102 allotted to itself to use this table area 102 as a device management/control information area.

Figure 9A:
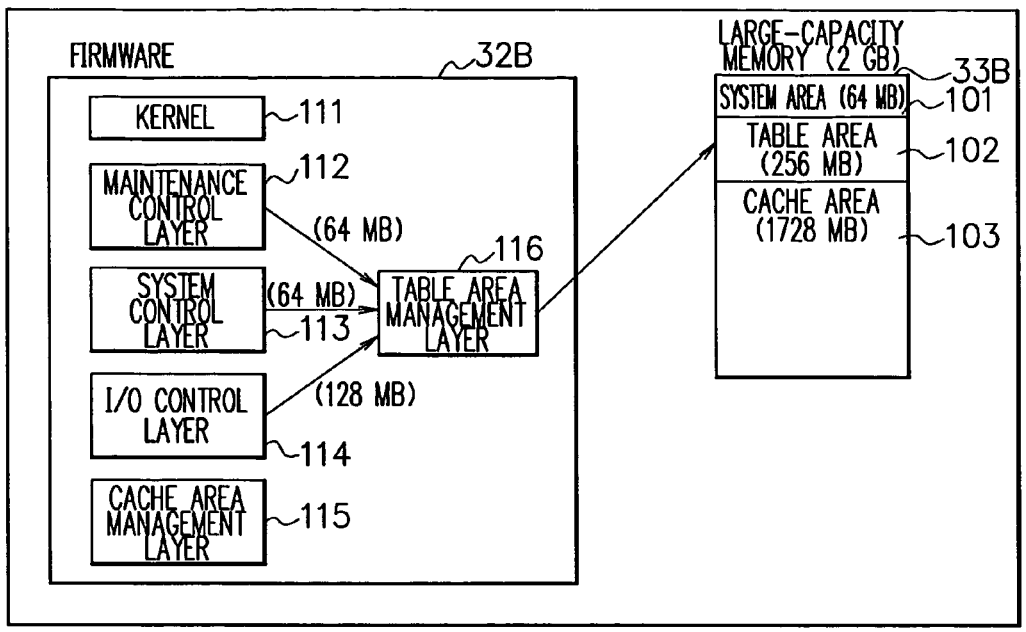
FIG. 9A and FIG. 9B are diagrams showing examples of memory allotment upon power-on in this embodiment.
Figure 9B:
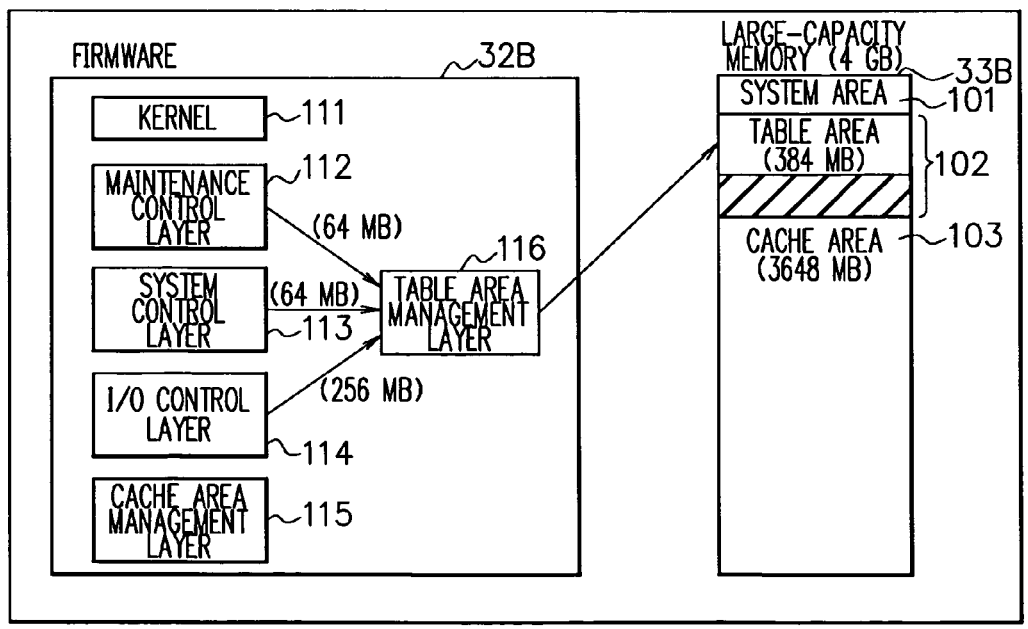

FIG. 9A and FIG. 9B are diagrams showing examples of the memory allotment upon power-on.

FIG. 9A shows a case where a large-capacity memory 33B with a 2 GB storage capacity is mounted, and FIG. 9B shows a case where a large-capacity memory 33B with a 4 GB storage capacity is mounted. Note that the size of the system area 101 is fixed at 64 MB in FIG. 9A and FIG. 9B.

As shown in FIG. 9A, when the 2 GB large-capacity memory 33B is mounted, each of the maintenance control layer 112 and system control layer 113 applies for a 64 MB memory capacity, and the I/O control layer 114 applies for a 128 MB memory capacity. The total size of the table areas 102 that the respective requesting layers 201 apply for by the memory allotment applications amounts to 256 MB.

Upon power-on of the disk array device 1B, an area corresponding to 64 MB starting from the head area of the large-capacity memory 33B is first secured as the system area 101.

Next, the table area management layer 116 sequentially allots memory capacities for which the respective requesting layers 201 apply, as the table areas 102. At this time, a storage capacity corresponding to 256 MB is allotted as the table areas 102. Therefore, the cache area 103 is an area corresponding to 1728 MB that is left after the memory capacities are allotted to the system area 101 and the table area 102.

Meanwhile, as shown in FIG. 9B, when the 4 GB large-capacity memory 33B is mounted, each of the maintenance control layer 112 and system control layer 113 applies for a capacity corresponding to 64 MB as in the case where the 2 GB large-capacity memory 33B is mounted. However, the I/O control layer 114 senses that the large-capacity memory 33B has a 4 GB capacity which is twice as large as that of the large-capacity memory 33B shown in FIG. 9A, and calculates an amount required for the device management/control information memories to apply for this amount. In this example, the I/O control layer 114 applies for a 256 MB memory capacity that is twice as large as that in the case where the 2 GB large-capacity memory 33B is mounted.

Upon power-on of the disk array device 1B, an area corresponding to 64 MB starting from the head area of the large-capacity memory 33B is first secured as the system area 101.

Next, the table area management layer 116 sequentially allots memory capacities for which the respective requesting layers 201 apply, as the table areas 102. In this example, 384 MB is allotted as the table areas 102. Therefore, the cache area 103 is an area corresponding to 3648 MB that is left after the memory capacities are allotted to the system area 101 and the table areas 102.

As described above, in the disk array device 1B according to this embodiment, the table area management layer 116 executes the memory allotment relating to the table area 102 based on the memory allotment application from each requesting layer 201 upon power-on. Consequently, a memory capacity that no requesting layer 201 applies for is not secured as the device management/control information area, so that it is possible to sufficiently secure the table area 102 as required. Therefore, when the operation of the disk array device 1B is to be started, it is possible to execute appropriate memory allotment according to the state of the disk array device 1B, which realizes the optimum memory allotment according to the current system setting.

Moreover, since in this memory allotment, each requesting layer 201 in the disk array device 1B, when applying for the memory allotment, automatically judges a necessary memory capacity upon power on according to the size of the mounted large-capacity memory 33B. This can free a user from a work such as calculation of an amount of memory to be used, so that it is possible to realize the optimum state without giving any load to the user.

Second Method: During Device Operation

Next, the process of allotting the table area 201 according to the second method will be described.

The second method is a method in which part of the cache area 103 is allotted as the table area 102 based on the memory allotment request from each requesting layer 201 while the disk array device 1B is in operation, as described above.

In the disk array device 1B in this embodiment, the following three interfaces are provided in the table area management layer 116 in order to realize the execution of expansion/reduction of the table area 102 in an active state (without ON/OFF of a power source while the device is in operation).

(1) an interface for accepting an active memory expansion/reduction request sent from the requesting layer 201 to the table area management layer 116

(2) an interface for transmitting a memory acquisition/release request to the cache area management layer 115 when the table area management layer 116 receives the active memory expansion/reduction request (3) an interface for synchronously transmitting the memory acquisition/release request to all the controller modules The table area management layer 116 further has a function of including/excluding a relevant memory area in/from its management object as the table area 102 in response to a memory acquisition/release completion notification sent from the cache area management layer 115.

Meanwhile, the cache area management layer 115 has an interface for accepting the memory acquisition/release request from the table area management layer 116. It further has a function of including/excluding a relevant memory area in/from its management object as the cache area 103 in response to the memory acquisition/release request. It also has a function of requesting the I/O control layer 114 to perform priority control for writing data that has not been written to the hard disk (dirty data), if there is any in an area to be allotted as the table area 102.

The following description shows the operation of expanding/reducing memories (the table area 102 and the cache area 103) in an active state while the device is in operation, using the above-described interfaces and functions.

First, an active memory expansion process of allotting part of the cache area 103 as the table area 102 in an active state while the device is in operation will be described.

Figure 11:
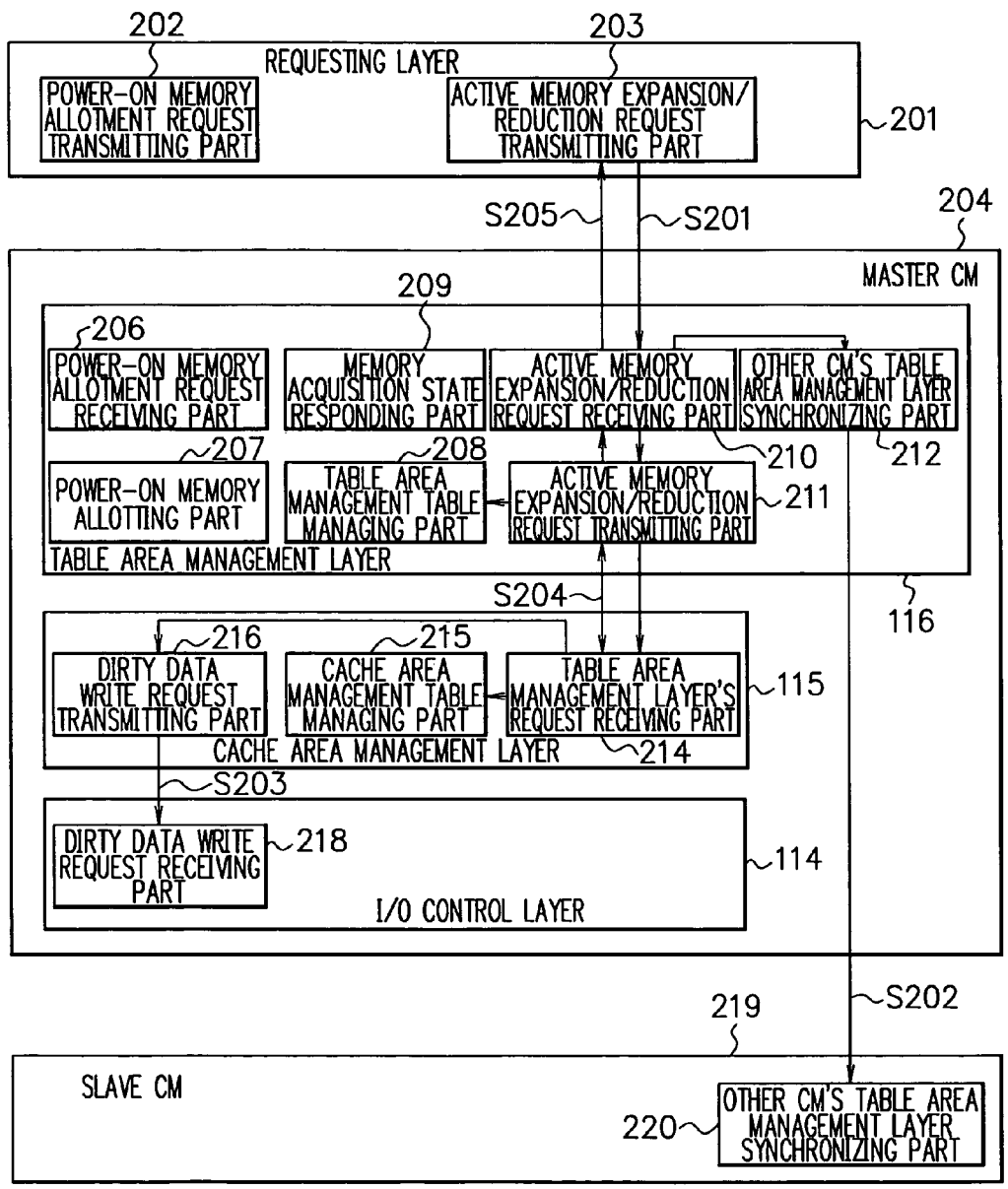
FIG. 11 is a diagram showing the flow of information involved in an active memory expansion/reduction process in this embodiment.

FIG. 10 is a sequence diagram showing the flow of the active memory expansion process, and FIG. 11 is a diagram showing the flow of information involved in the active memory expansion process.

First, while the disk array device 1B is in operation, the requesting layer 201 that wants to newly use a memory as the table area 102 sends a memory expansion request S201 to the table area management layer 116 (P201). In response thereto, the table area management layer 116 sends an acquisition request of necessary memories to the cache area management layer 115 and the other CM (slave CM) 219 (P202, P203).

In order to allot a memory area corresponding to the requested capacity, the cache area management layer 115 receiving the memory acquisition request excludes an area corresponding to the requested memory capacity in the cache area 103 from its management object and sets this area as a memory to be allotted as the table area 102 (P204). Further, in synchronization with this process, the other CM (slave CM) 219 excludes an area corresponding to the requested memory capacity in its own cache area 103 from its management object and sets this area as a memory to be allotted as the table area 102, based on an other CM synchronization request S202 sent from the table area management layer 116 (P205).

Then, when the area to be allotted as the table area 102 is excluded from its management object, the cache area management layer 115 transmits a memory acquisition response to the table area management layer 116 and the other CM 219 transmits an allotment preparation completion response to the table area management layer 116 (P206, P207).

Consequently, the memory area excluded from the management object and set as the area to be allotted as the table area 102 is not used as the cache area 103 thereafter. Further, when dirty data exists in the area to be allotted, the cache area management layer 115 sends a dirty data write request S203 to the I/O control layer 114 so that the I/O control layer 114 gives priority to the write of the dirty data to the hard disk. Consequently, the dirty data in the area to be allotted is written to the hard disk (P208, P209).

Then, the table area management layer 116 sends a memory acquisition state confirmation request S204 to the cache area management layer 115 and the other CM 219 (P210, P211). In response to the confirmation request, the cache area management layer 115 and the other CM 219 send a memory nonvacancy response S204 when dirty data remains in the area to be allotted. On the other hand, when the area to be allotted is completely vacant, that is, when the write of the dirty data to the hard disk has been completed, a memory acquisition completion response is sent to the table area management layer 116 (P214, P215).

The table area management layer 116, upon receipt of the memory acquisition completion response, sets the area to be allotted as the management object of the table area management layer 116 in order to allow this area to be used as the table area 102 (P217). Note that this process is also synchronously executed in the other CM (P216, P218, P219).

When the management setting of the area to be allotted as the table area 102 is finished, the table area management layer 116 returns a memory expansion completion response S205 to the requesting layer 201 (P220). Consequently, the requesting layer 201 is capable of using the memory with the requested size as the table area 102 for storing the device management/control information.

Figure 12A:
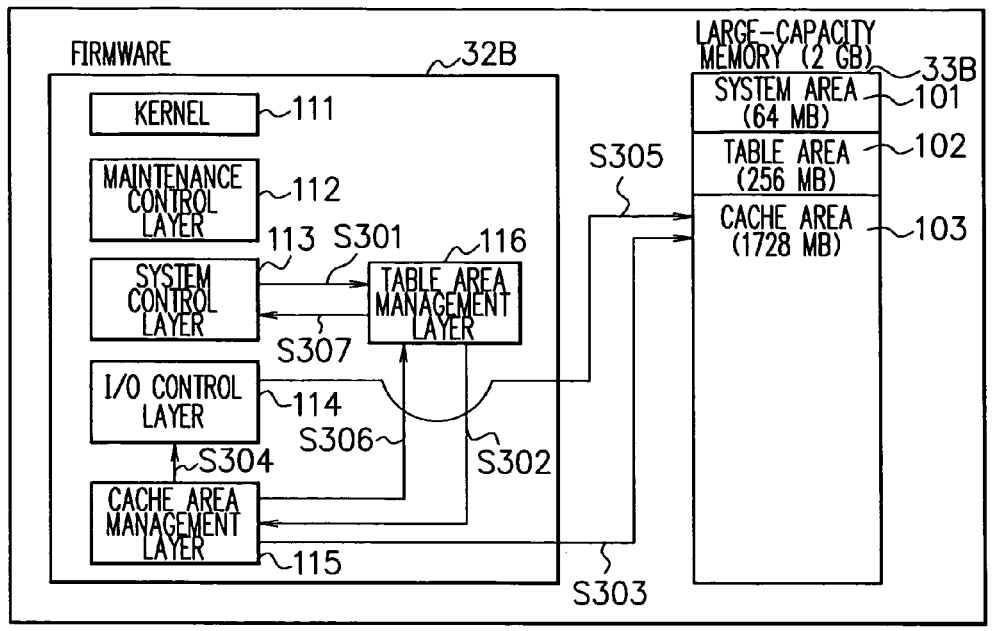
FIG. 12A and FIG. 12B are diagrams showing examples of active memory expansion in this embodiment.
Figure 12B:
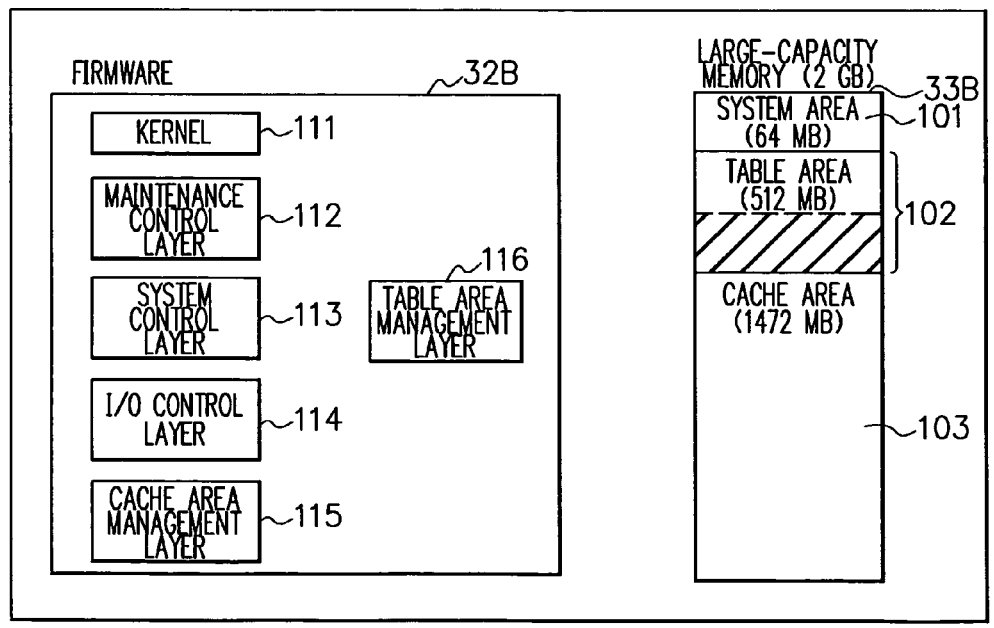

FIG. 12A and FIG. 12B are diagrams showing examples of active memory expansion. In FIG. 12A and FIG. 12B, it is assumed that the large-capacity memory 33B has a 2 GB capacity, the size of the system area 101 is 64 MB, the size of the table area 102 before the active memory expansion is 256 MB, and the size of the cache area 103 is 1728 MB.

As shown in FIG. 12A, when receiving, for example, a 256 MB memory expansion request from the system control layer 113 while the device is in operation (S301), the table area management layer 116 sends a memory acquisition request to the cache area management layer 115 (S302). The cache area management layer 115, when receiving the memory acquisition request, allots 256 MB out of the cache area 103 as the table area (S303). Further, the cache area management layer 115 sends a dirty data write request of the target memory area (area to be allotted) to the I/O control layer 114 (S304), and the I/O control layer 114 executes the process of writing the dirty data to the hard disk with priority (S305).

As a result, the cache area management layer 115 transmits a memory acquisition completion response to the table area management layer 116 (S306), and an active memory expansion completion response is transmitted to the system control layer 113 after the management object setting for allowing the acquired area to be used as the table area 102 is completed (S307).

Consequently, the system control layer 113 is capable of newly using a memory corresponding to 256 MB as the device management/control information memory (see FIG. 12B). FIG. 12B shows a state after the active memory expansion is completed, in which the size of the table area 102 is changed to 512 MB and the size of the cache area 103 is changed to 1472 MB.

The following description will be on an active memory reduction process in which part of the table area 102 is released to be allotted as the cache area 103 in an active state while the device is in operation.

Figure 13:
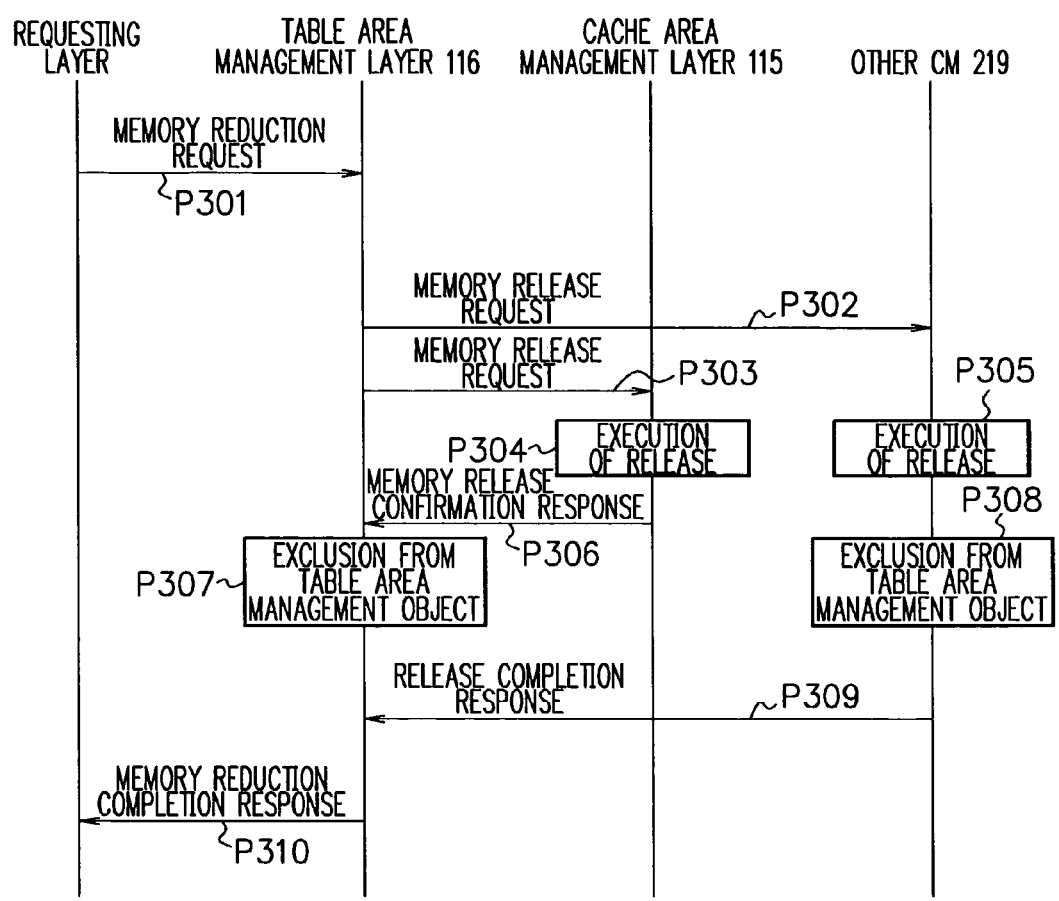
FIG. 13 is a sequence diagram showing the flow of an active memory reduction process in this embodiment.

FIG. 13 is a sequence diagram showing the flow of the active memory reduction process.

First, while the disk array device 1B is in operation, the requesting layer 201 that wants to release a memory area secured as the table area sends an active memory release request to the table area management layer 116 (P301). In response to this request, the table area management layer 116 sends a target memory release request to the cache area management layer 115 and the other CM (slave CM) 219 (P302, P303).

The cache area management layer 115 receiving the memory release request sets the memory area whose release is requested, as the management object of the cache area management layer 115 in order to allow this memory area to be used as the cache area 103 (P304). Further, in synchronization with this process, the other CM (slave CM) 219 sets the memory area whose release is requested, as the management object of its own cache area management layer 115 (P305).

When the memory area whose release is requested is set as the management object, the cache area management layer 115 sends a memory release confirmation as a response to the table area management layer 116 (P306). The table area management layer 116, when receiving the memory release confirmation response, excludes this memory from the management object of the table area management layer 116 (P307). Then, the table area management layer 116 returns a memory reduction completion response to the requesting layer 201 when the preparation is completed (P310). Consequently, the memory area whose release from the table area 102 is requested is usable as the cache area 103.

Figure 14A:
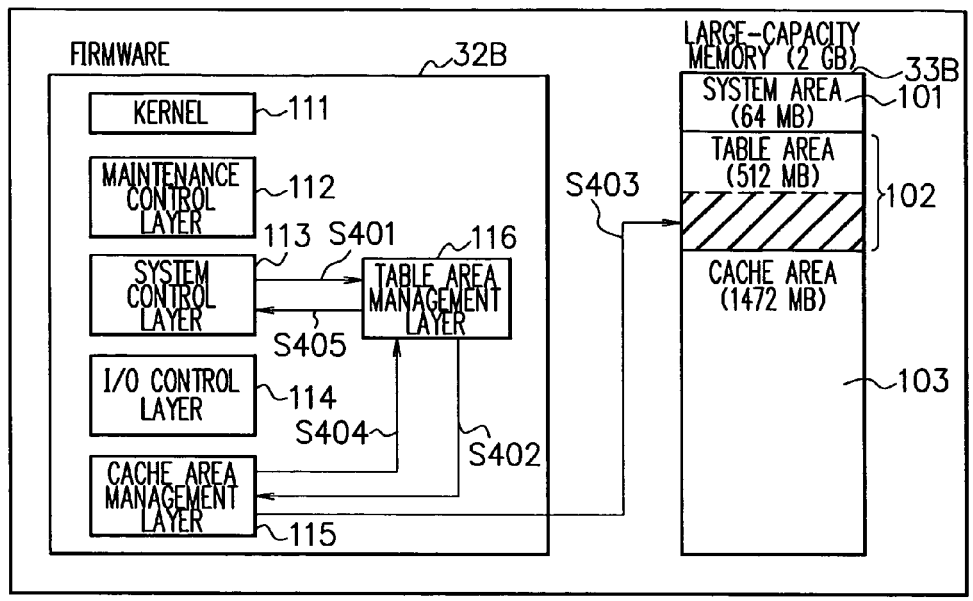
FIG. 14A and FIG. 14B are diagrams showing examples of active memory reduction in this embodiment.
Figure 14B:
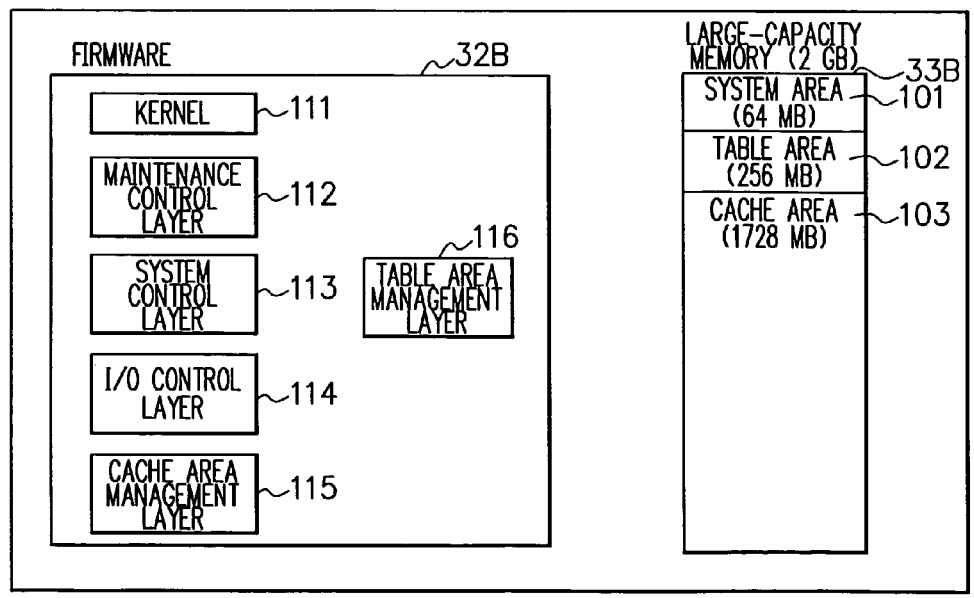

FIG. 14A and FIG. 14B are diagrams showing examples of the active memory reduction. In FIG. 14A and FIG. 14B, the capacity provided in the large-capacity memory 33B and the state of the memory allotment are assumed to be the same as those when the active memory expansion process shown in FIG. 12B is completed.

As shown in FIG. 14A, when receiving a 256 MB memory reduction request from, for example, the system control layer 113 while the device is in operation (S401), the table area management layer 116 sends a memory release request to the cache area management layer 115 (S402). The cache area management layer 116, when receiving the memory release request, executes management object setting in order to allow a target memory area corresponding to requested 256 MB to be used as the cache area 102 (S403).

After this setting is completed, the cache area management layer 115 transmits a memory release completion response to the table area management layer 116 (S404). Further, after the table area management layer 116 thereafter executes setting for excluding the relevant memory area from the management object of the table area management layer 116, it transmits an active memory reduction completion response to the system control layer 113 (S405).

Consequently, the 256-MB memory area released from the table area 102 is usable as the cache area 103 (see FIG. 14B). FIG. 14B shows the state after the active memory reduction is completed, in which the size of the table area 102 is changed to 256 MB and the size of the cache area 103 is changed to 1728 MB. This means that the state is returned to the state before the active memory expansion shown in FIG. 12A is executed. In this manner, it is possible to flexibly change the intended use of the memory in use according to the state of the disk array device 1B.

As described above, according to this embodiment, even while the device is in operation, it is possible to acquire and release the device management/control information area, namely, the table area 102, at an arbitrary instance. Consequently, it is possible to allot this area as the cache area 103 during a period when the device management/control information area is not necessary and to allot part of the cache area 103 as the table area 102 when there arises a demand for the device management/control information area. Therefore, it is possible to change the sizes of the table area 102 and the cache area 103 in an active state even while the device is in operation. This enables more effective use of a cache memory that is a limited resource.

As described above, in the disk array device 1B according to this embodiment, it is possible to secure the table area 102 large enough to store the management/control information as required according to the current state of the device not only upon power-on but also while the device is in operation and to appropriately release the table area 102 when it is not necessary. Consequently, it is possible to make utmost use of the mounted large-capacity memory 33B as a cache memory according to the state of the device, which enables improved performance of the device. Further, this active memory expansion/reduction process is executable while the device is in operation, independent of the state of the device. Therefore, a nonstop operation can be realized in a disk array device often configured as a society system. This enables flexible use of the device while maintaining high reliability and high availability.

Incidentally, in the above description, each of the areas 101, 102, 103 in the large-capacity memory 33B is shown as one continuous area, but may be structured as a plurality of discontinuous areas. For example, the table area 102 and the cache area 103 may be structured such that the sizes thereof can be arbitrarily set, a predetermined capacity (for example, 2 MB) being a management unit, and the table areas 102 is provided to be distributed in the cache area 103.

According to the present invention, a system area managed by an operating system, a cache area as a cache memory, and a table area which stores management/control information relating to the device and whose area size is changeable at an arbitrary instant are provided in a memory mounted in a control part of a disk array device. Consequently, it is possible to arbitrarily change the size of the table area in an active state according to the state of the device, without ON/OFF of a power source even while the device is in operation. This allows an area not in use in the table area to be released for use as the cache area. Consequently, it is possible to change the sizes of the cache area serving as the cache memory and the table area storing management/control information, as required in an active state while the device is in operation. This enables appropriate allotment of the respective areas according to the state of the disk array device, thereby realizing effective use of the memory.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A disk array device comprising:
a control part having a processor and a memory and controlling the disk array device;
a plurality of disk devices storing data, the data being read/written by said control part,
wherein the memory comprises:
a system area managed by an operating system;

a cache area serving as a cache memory to temporarily store input/output data; and a table area storing management/control information relating to the disk array device;

wherein the memory is capable of setting a first area which is not in use in the cache area as the table area, using the first area, and resetting the first area as the cache area after use; and the memory is capable of setting a second area which is not in use in the table area as the cache area, using the second area, and resetting the second area as the table area after use, while the disk array device is in use; and wherein, when data unwritten to said disk device exists in part of the cache area to be allotted as the table area in response to an expansion request of the table area, priority write control of the data unwritten to said disk device is executed.

2. The disk array device according to claim 1, further comprising:

a system area managing part managing the system area of the memory;

a cache area managing part managing the cache area of the memory; and a table area managing part managing the table area of the memory.

3. The disk array device according to claim 2, wherein said control part has a plurality of internal control parts controlling inner parts of the disk array device, and the disk array device further comprising an interface through which each of the internal control parts sends an expansion/reduction request of the table area to said table area managing part in an active state while the disk array device is in operation.

4. The disk array device according to claim 3, further comprising an interface through which said table area managing part sends a memory acquisition/release request to said cache area managing part based on the expansion/reduction request of the table area sent from any of the internal control parts.

5. The disk array device according to claim 4, wherein, when receiving an expansion request of the table area from any of the internal control parts, said table area managing part sends an acquisition request of a memory capacity requested by the expansion request, to said cache area managing part, and wherein said cache area managing part sets part of the cache area corresponding to the memory capacity requested by said table area managing part, as an area to be allotted as the table area and excludes the area from an own management object.

6. The disk array device according to claim 1, wherein said table area managing part sets the area to be allotted, as an own management object when confirming a result of the memory acquisition/release request to confirm that the acquisition of the memory capacity requested by the expansion request of the table area is completed.

7. The disk array device according to claim 4, wherein, when receiving a reduction request of the table area from any of the internal control parts, said table area managing part sends a release request of a memory area requested by the reduction request, to said cache area managing part, and wherein said cache area managing part sets the memory area whose release is requested by said table area managing part as an own management object.

8. The disk array device according to claim 7, wherein said table area managing part excludes from the own management object the memory area requested by the reduction request of the table area when confirming a result of the memory acquisition/release request to confirm that the release of the memory area is completed.

9. The disk array device according to claim 3, wherein the plural control parts are provided, and wherein the expansion/reduction request of the table area from any of the internal control parts is synchronously sent to said plural control parts.

10. The disk array device according to claim 2, wherein said control part has a plurality of internal control parts controlling inner parts of the disk array device, and the disk array device further comprising an interface through which each of the internal control parts sends to said table area managing part an application for a memory capacity to be requested as the table area, upon activation of the disk array device.

11. The disk array device according to claim 10, wherein said table area managing part sequentially allots the table areas to the internal control parts upon activation of the disk array device, based on contents of the applications sent from the internal control parts.

12. The disk array device according to claim 10, wherein the plural control parts are provided, and wherein the application from any of the internal control parts is synchronously sent to said plural control parts.

13. The disk array device according to claim 2, wherein said control part has a plurality of internal control parts controlling inner parts of the disk array device, and wherein an area size of the table area is changed in an active state while the disk array device is in operation, based on an expansion/reduction request of the table area from any of the internal control parts.

14. The disk array device according to claim 13, wherein said table area managing part comprises a memory acquisition/release requesting part that sends an acquisition/release request of a memory area to said cache area managing part, in response to the expansion/reduction request of the table area sent from any of the internal control parts.

15. The disk array device according to claim 14, wherein said table area managing part comprises a table area setting part that sets the memory area, which is acquired based on the request from the memory acquisition/release requesting part, as the table area.

16. The disk array device according to claim 14, wherein said cache area managing part comprises a cache area setting part that sets the memory area, which is released based on the request from the memory acquisition/release requesting part, as the cache area.

17. The disk array device according to claim 13, wherein the plural control parts are provided, and wherein each of said control parts has a communication part mutually transmitting/receiving the expansion/reduction request of the table area sent from any of the internal control parts.

18. The disk array device according to claim 2, wherein said control part has a plurality of internal control parts controlling inner parts of the disk array device, and wherein the table areas are sequentially allotted upon activation of the disk array device based on contents of applications, which are sent from the internal control parts, for memory capacities to be requested as the table areas, and the memory capacities requested by the internal control parts are arbitrarily settable according to a capacity of the memory mounted on the control part.

* * * * *